(12) United States Patent
Zhao et al.

(10) Patent No.: US 11,061,731 B2
(45) Date of Patent: Jul. 13, 2021

(54) METHOD, DEVICE AND COMPUTER READABLE MEDIUM FOR SCHEDULING DEDICATED PROCESSING RESOURCE

(71) Applicant: EMC IP Holding Company LLC, Hopkinton, MA (US)

(72) Inventors: Junping Zhao, Beijing (CN); Kun Wang, Beijing (CN); Layne Lin Peng, Shanghai (CN); Fei Chen, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 16/389,166

(22) Filed: Apr. 19, 2019

(65) Prior Publication Data

US 2019/0324810 A1    Oct. 24, 2019

(30) Foreign Application Priority Data

Apr. 20, 2018 (CN) .......................... 201810360413.9

(51) Int. Cl.
*G06F 9/50* (2006.01)
*G06F 8/41* (2018.01)

(52) U.S. Cl.
CPC ................ *G06F 9/505* (2013.01); *G06F 8/43* (2013.01)

(58) Field of Classification Search
CPC ....................................................... G06F 9/505
See application file for complete search history.

(56) References Cited

U.S. PATENT DOCUMENTS

| | | | |
|---|---|---|---|
| 10,581,675 B1* | 3/2020 | Iyer ......................... | G06N 20/00 |
| 2010/0005274 A1* | 1/2010 | Van De Waerdt .... | G06F 9/3828 |
| | | | 712/203 |
| 2014/0101636 A1* | 4/2014 | Correll ...................... | G06F 8/41 |
| | | | 717/113 |
| 2014/0229713 A1* | 8/2014 | Muff ...................... | G06F 9/3016 |
| | | | 712/208 |
| 2016/0203031 A1* | 7/2016 | Chai ...................... | G06F 9/5083 |
| | | | 718/104 |

* cited by examiner

*Primary Examiner* — Charlie Sun
(74) *Attorney, Agent, or Firm* — Ryan, Mason & Lewis, LLP

(57) ABSTRACT

A method of scheduling a dedicated processing resource includes: obtaining source code of an application to be compiled; extracting, during compiling of the source code, metadata associated with the application, the metadata indicating an amount of the dedicated processing resource required by the application; and obtaining, based on the metadata, the dedicated processing resource allocated to the application. In this manner, performance of the dedicated processing resource scheduling system and resource utilization is improved.

20 Claims, 6 Drawing Sheets

METHOD, DEVICE AND COMPUTER READABLE MEDIUM FOR SCHEDULING DEDICATED PROCESSING RESOURCE

RELATED APPLICATION(S)

The present application claims priority to Chinese Patent Application No. 201810360413.9, filed Apr. 20, 2018, and entitled "Method, Device, and Computer Readable Medium for Scheduling Dedicated Processing Resource," which is incorporated by reference herein in its entirety.

FIELD

The present disclosure generally relates to scheduling of a dedicated processing resource, and more specifically, to a method, a device and a computer readable medium for scheduling a dedicated processing resource.

BACKGROUND

Applications on a client could be designed to implement various processing or analysis tasks utilizing various resources such as processing and storage resources. As the tasks, such as machine learning, deep learning, data mining or the like, are increasingly complicated, a large amount of and/or variable dedicated processing resources are required for running respective applications. For example, a cloud-based computing system has been developed which includes a machine having one or more dedicated processing resources. Different clients may lease the dedicated resources of the computing system to run the respective applications as needed. In order to serve these processing and analysis tasks in a better way, it is required to estimate a resource amount of dedicated processing resources needed for performing the processing and analysis tasks, thus improving the scheduling process for the dedicated processing resources.

SUMMARY

Embodiments of the present disclosure provide a method, a device and computer readable medium for scheduling a dedicated processing resource.

In accordance with a first aspect of the present disclosure, there is provided a method of scheduling a dedicated processing resource. The method comprises obtaining a source code of an application to be compiled; extracting, during compiling of the source code, metadata associated with the application, the metadata indicating an amount of the dedicated processing resource required by the application; and obtaining, based on the metadata, the dedicated processing resource allocated to the application.

In accordance with a second aspect of the present disclosure, there is provided a device for scheduling a dedicated processing resource. The device comprises at least one processing unit; and at least one memory coupled to the at least one processing unit and storing instructions executed by the at least one processing unit, the instructions, when executed by the at least one processing unit, causing the device to execute acts, the acts comprising obtaining a source code of an application to be compiled; extracting, during compiling of the source code, metadata associated with the application, the metadata indicating an amount of the dedicated processing resource required by the application; and obtaining, based on the metadata, the dedicated processing resource allocated to the application.

In accordance with a third aspect of the present disclosure, there is provided a computer readable medium. The computer-readable program product comprises machine-executable instructions thereon, and the machine-executable instructions, when executed by the at least one processor, cause the at least one processor to implement the method in accordance with the first aspect.

This Summary is provided to introduce a selection of the concepts in a simple form which are further described hereinafter in the Detailed Description. This Summary is not intended to identify the key features or essential features of the claimed subject matter, nor is it intended to limit the scope of the present disclosure.

BRIEF DESCRIPTION OF THE DRAWINGS

The above and other objectives, features, and advantages of example embodiments of the present disclosure will become more apparent, through the detailed description of example embodiments of the present disclosure in combination with the accompanying drawings, in which like reference numbers generally represent like components.

DETAILED DESCRIPTION

Figure 1:
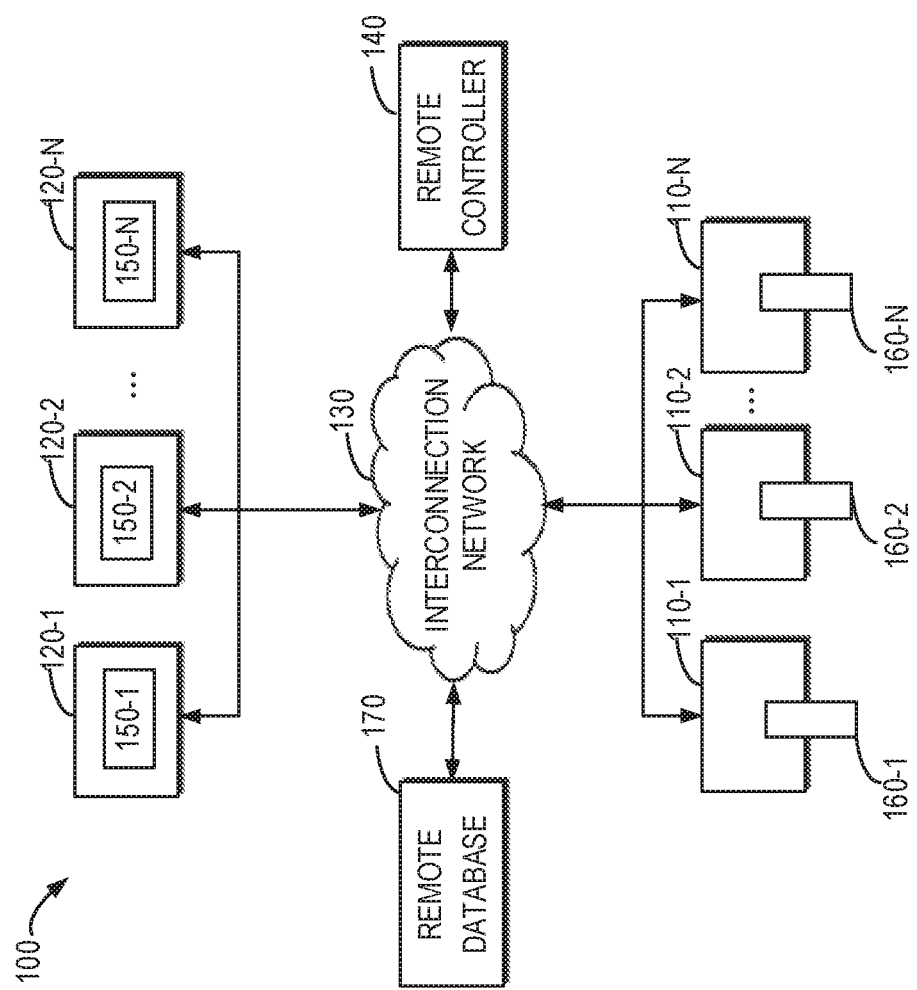
FIG. 1 illustrates a schematic block diagram of a system in which some embodiments of the present disclosure may be implemented.

Preferred embodiments of the present disclosure will be described in more detail with reference to the drawings hereinafter. It should be appreciated that although the drawings illustrate preferred embodiments of the present disclosure, the present disclosure may be implemented in various manners but not be limited to the embodiments as described herein. Rather, these embodiments are provided to make the present disclosure more thoroughly and completely and convey the scope of the present disclosure fully to those skilled in the art.

As used herein, the term "include" and its variants are to be read as open-ended terms that mean "includes, but not limited to." The term "or" is to be read as "and/or" unless the context clearly indicates otherwise. The term "based on" is to be read as "based at least partially on." The term "an example embodiment" and "an embodiment" are to be read as "at least one example embodiment." The term "another embodiment" is to be read as "at least one further embodiment." The term "first," "second" or the like may indicate the different or the same objects. Other explicit or implicit definitions may be included hereinafter.

A process utilizing emerging technologies, such as deep learning, high performance computing, machine learning, artificial intelligent, etc., requires a large amount of dedicated processing resources over a long time period. For example, the process utilizing these emerging technologies imposes extremely high requirements on the computing capability for dedicated processing resources (which is typically represented by Float Operations Per Second (FLOPS)) and the storage capability (memories for dedicated processing resources) over several hours, days, or even weeks. Hence, prior to performing the process utilizing these emerging technologies, correctly estimating a resource amount of the dedicated processing resources required for the process is of great significance to the improvement of the utilization of the dedicated processing resources and reduction of the cost.

Since the dedicated processing resources, such as a Graphics Processing Units (GPUs), are often costly, configuring a dedicated GPU resource for each application would significantly increase the cost, therefore, it is essential to run the application on a shared GPU. In a circumstance where a quality of service (QoS) is satisfied, a number of objectives, such as improving the GPU utilization and reducing resource competition, may be accomplished by performing reasonable scheduling on an appropriate GPU. Therefore, prior to performing the process utilizing these emerging technologies, correctly estimating a resource amount of the dedicated processing resources required by the processing plays an important role for improving the utilization of the dedicated processing resources and reducing the cost.

Generally, either a large amount of prior knowledge or applications/frameworks for these emerging technologies is needed to estimate the resource amount of dedicated processing resources required for performing the process in the applications/frameworks for the emerging technologies. It is generally not feasible for a user to have a large amount of prior knowledge for manually estimating the resource amount of the dedicated processing resources required by utilizing these emerging technologies. First, for example, the manual tuning probably requires a tuning performer with master professional skills, including a deep understanding about the model, system, GPU hardware or the like. Second, when the source code is modified, the GPU resource amount should be re-tuned, which is time consuming. Further, if too many resources are allocated to an application, unnecessary resource waste will incur.

In order to at least partly solve one or more of the above and other potential problems, embodiments of the present disclosure provide a solution of scheduling a dedicated processing resource. In the solution, by extracting, in the compiling process of the application, metadata related to the application, the dedicated processing resources required when an application is in an actual running state may be estimated. During the actual running (execution) of the application, a remote controller may be used to allocate dedicated processor resources in a dedicated processing resource pool to the application. In this way, the number of dedicated processing resources required during the actual running of the application can be predicted automatically. Since this process is performed automatically, a user is allowed to modify or tune a model of the application frequently; meanwhile, the dedicated processing resources required by the application can be predicted efficiently. Therefore, the dedicated processing resources can be scheduled according to the required resource amount which is estimated accurately, thus the performance of the dedicated processing resource scheduling system and the resource utilization may be improved.

It should be noted that, although discussion is made with a deep learning application as an example of the emerging technologies herein, it should be appreciated that embodiments of the present invention are also applicable to other emerging technologies, such as a high-performance computing application, a machine-learning application and an artificial intelligent application.

FIG. 1 illustrates a schematic diagram of an example computing system 100 in which embodiments of the present disclosure can be implemented. In the computing system 100, a plurality of servers are deployed, including a server 110-1, a server 110-2 . . . a server 110-N (which are collectively referred to as a server 110 hereinafter, wherein N represents a natural number greater than 1). The computing system 100 further includes a dedicated processing resource 160-1, a dedicated processing resource 160-2 . . . a dedicated processing resource 160-N (which are collectively referred to as a dedicated processing resource 160 hereinafter, wherein N represents a natural number greater than 1). Each server 110 includes one or more dedicated processing resources 160 thereon. The dedicated processing resource cluster or pool including a plurality of dedicated processing resource servers 160 is dynamic and shared.

In the example of FIG. 1, the server 110-1 has a dedicated processing resource 160-1, the server 110-2 has a dedicated processing resource 160-2, and the server 110-N has a dedicated processing resource 160-N. Examples of the dedicated processing resource 160 can include, but are not limited to, a GPU, a Field-Programmable Gate Array (FPGA), or the like. For ease of discussion, some embodiments are described by using GPU as an example of the dedicated processing resource 160. In addition to the dedicated processing resource 160, the server 110 may also include one or more general processing units (not shown) of a Central Processing Unit (CPU), for example.

FIG. 1 further illustrates a plurality of clients 120-1, 120-2 . . . 120-N (which are collectively or separately referred to as a client 120 hereinafter, wherein N represents a natural number greater than 1), each of the plurality of clients 120-1, 120-2 . . . 120-N having a respective application 150-1, 150-2 . . . 150-N (which are collectively referred to as an application 150 hereinafter, where N represents a natural number greater than 1) to be run. The application 150 may be any application operable on a machine, which may be designed to perform respective data processing and analysis task, or the like. For example, the application 150 can perform the related data processing or analysis tasks, such as deep learning (DL), machine learning (ML) or high-performance computing (HPC), artificial intelligence (AI) or the like.

In order to run the applications 150 in a rapid and efficient manner, the client 120 may request the dedicated processing resource 160 of the server 110 to run these applications 150. In such an implementation, the client 120 can be connected to one or more servers 110 via an interconnection network 130, and hand the applications 150 over to the one or more dedicated processing resources 160 of the server 110 for running. Depending on an interface supported by the client 120, the server 110 and/or the dedicated processing resource 160, the interconnection network 130 can support a variety of wired or wireless connections of various network transmission technologies, such as Remote Direct Memory Access (RDMA), Transmission Control Protocol (TCP), or the like.

It should be appreciated that the device and/or arrangement as shown in FIG. 1 is merely an example. In other examples, the computing system 100 may include any suitable number of servers 110 and clients 120. Each server 110 may be provided with any suitable number of dedicated processing resources 160, and each client 120 may have a plurality of applications 150 to be run. Moreover, the dedicated processing resource scheduling system 100 also includes a remote controller 140 and a remote database 170.

The remote controller 140 can allocate, based on the resource amount of the dedicated processing resources requested by the client 120 and the available dedicated processing resources in the system 100, the dedicated processing resource 160 for the client 120. Then, the client 120 can request the allocated dedicated processing resource 160 to the dedicated processing resource server 110. The remote database 170 may communicate with the client 120 and the remote controller 140 through the interconnection network 130. The remote database 170 can store the extracted metadata when the client 120 compiles the application 150 and the metadata can be obtained by the remote controller 140. It is to be appreciated that the controller 140 and the remote database 170 can be implemented on the same device, although they are shown separated in FIG. 1.

For clear and concise description, the example embodiments of the present disclosure are described in detail, with the GPU being used as an example of the dedicated processing resource 160. It is known that a GPU is a dedicated processor, with its powerful computing capacity based on a large number of kernels and a high-bandwidth memory. In a GPU hardware architecture, a GPU typically has a large number of GPU kernels, for example, thousands of or even nearly ten thousand kernels. The GPU kernel, as a type of dedicated processing resource, is the most basic processing unit, which is also referred to as a stream processor (SP). Both the instructions and tasks are ultimately processed on the GPU kernels. A plurality of GPU kernels perform an instruction simultaneously, thereby enabling a parallel computing of the GPUs. A plurality of SPs, together with some other resources, such as a register or a shared memory, can constitute a streaming multiprocessor (SM).

However, it should be appreciated that the GPU is merely an exemplary dedicated processing resource 160, which is not intended to limit the scope of the present disclosure. The principles described herein can be applied to other dedicated processing resources, for example, those in an accelerator such as an FPGA or the like, regardless of whether currently existing or to be developed in the future, and which are not limited to GPU kernels.

Figure 2:
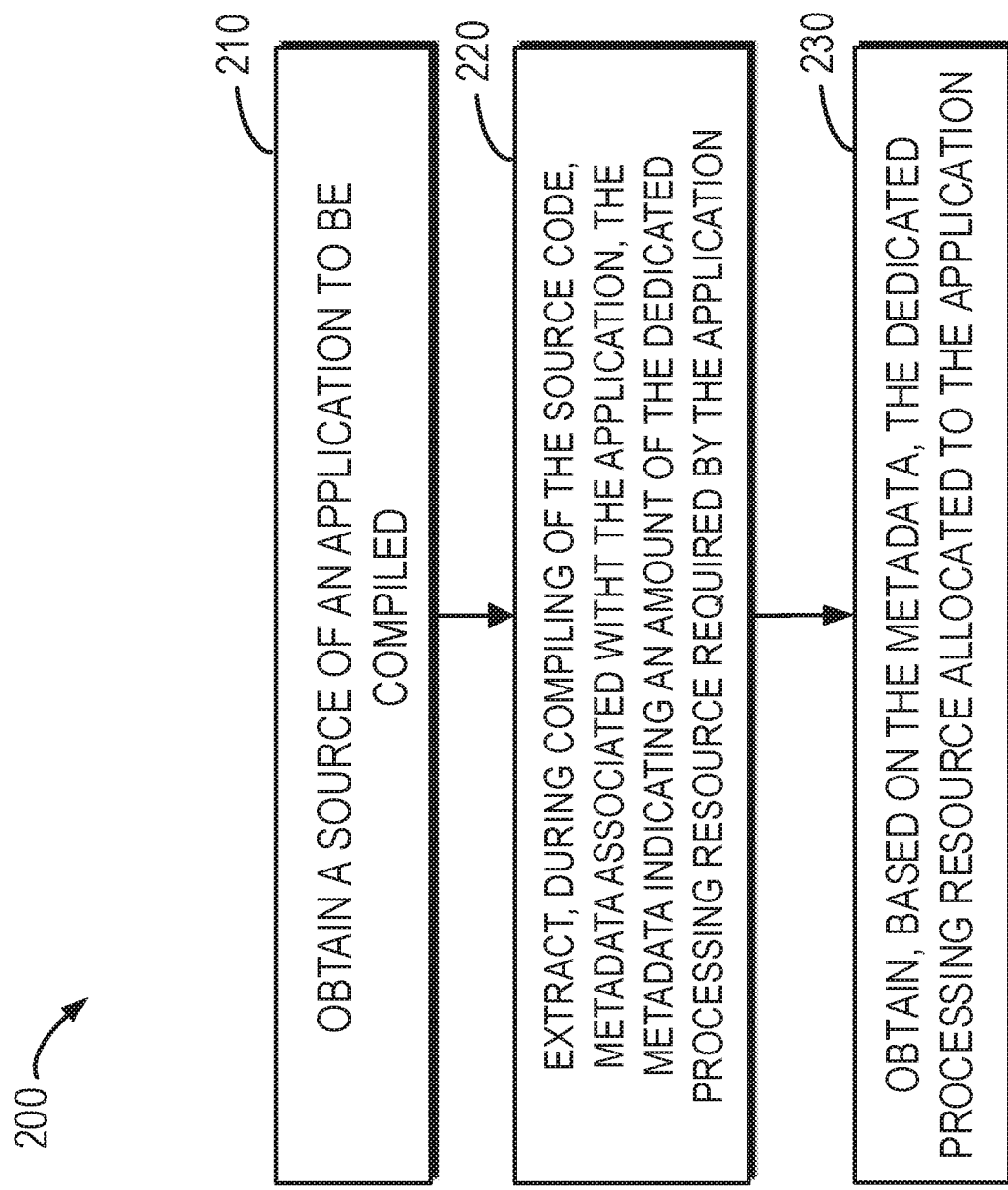
FIG. 2 illustrates a flowchart of a method of scheduling a dedicated processing resource according to some embodiments of the present disclosure.

FIG. 2 illustrates a flowchart of a method 200 of scheduling the dedicated processing resources 160 according to some embodiments of the present disclosure. The method 200 may, for example, be performed at the client 120 as illustrated in FIG. 1.

At step 210, the client 120 obtains a source code of the application 150 to be compiled for compiling. As a non-limiting embodiment, the source code may be Python source code. The deep learning (DL) application in embodiments of the present disclosure is used as an example to describe the application 150. The deep learning application may include an application which is used for picture classification or automatic driving. Currently, a popular deep learning framework includes Tensorflow, MXNet, or the like. In a non-limiting embodiment, a compiler in the client 120 loads the source code for compiling. The compiler may compile the source code into executable binary code. The existing technologies for compiling of the deep learning application include XLA by the Tensorflow, TVM stack by the MXNet, Ngraph by the Intel, or the like. A metadata extraction function is added to the compiler in embodiments of the present disclosure, such that the GPU resources required by the application 150 can be estimated. The specific contents on the extracted metadata will be described hereinafter.

At step 220, during the compiling of the source code, the compiler extracts metadata associated with the application 150, wherein the metadata indicates the amount of a dedicated processing resources required by the application 150. The compiler is coupled to the client 120. The extracted metadata may include information about a model of the deep learning application and information about the dedicated processing resource required by the application.

The manner of performing compiling by the compiler may include two kinds of GPU compiling, static compiling and dynamic compiling. It should be appreciated that both the two kinds of compiling are transparent to the deep learning model, and may be configured by the deep learning architecture. The static compiling is Ahead-Of-Time compiling, and executable GPU binary code is generated after compiling and linking all the related code and libraries, which includes specific GPU hardware information, and relies on that information. Although the static compiling has a wide application and is usually slow in compiling, it exhibits good performance in terms of portability. The static compiling may lack deep specific optimization hardware. The dynamic compiling is Just-In-Time compiling, which is performed during running (prior to the actual running). Available specific GPU hardware information is utilized and code is compiled dynamically for specific GPU hardware. The dynamic compiling may be slow in initial kernel loading, but because of optimization specific to hardware, may be fast in execution or have denser memory footprints. The dynamic compiling is especially useful to some mobile or embedded devices.

A non-limiting dynamic compiling example is a TVM stack compiling framework by MXNet, where a high-level model analysis independent of the hardware is performed first, and the compiling and optimization for the hardware are then performed. Another dynamic compiling is XLA by Tensorflow, where a high-level optimization independent of hardware is performed first, including general commands, fusion, cache analysis or the like, followed by a bottom-layer optimization specific to hardware, including further fusion, segmentation or the like. Executable binary code can be subsequently generated. With these compiling technologies, the deep learning application may be optimized to achieve a faster performance, fewer footprints or higher portability, thereby improving the performance of specific hardware. It should be appreciated that compiling techniques in existing technologies are applicable to embodiments of the present disclosure.

The manner of extracting metadata includes dynamic extraction and static extraction. In the dynamic extraction, said metadata are extracted through an extraction function which is embedded in a compiler for compiling the source code. In a non-limiting embodiment, during compiling, model information including a batch size, layer information, etc. may be extracted with a hook function or command. Further, kernel computing resources can be estimated by a particular program interface or expression. In the static extraction, the compiler obtains a journal produced during compiling of the source code. The compiler then extracts the metadata associated with the application 150 according to the journal. As a non-limiting example, a utilizing condition of a static CPU memory is extracted using a particular program expression.

Figure 3:
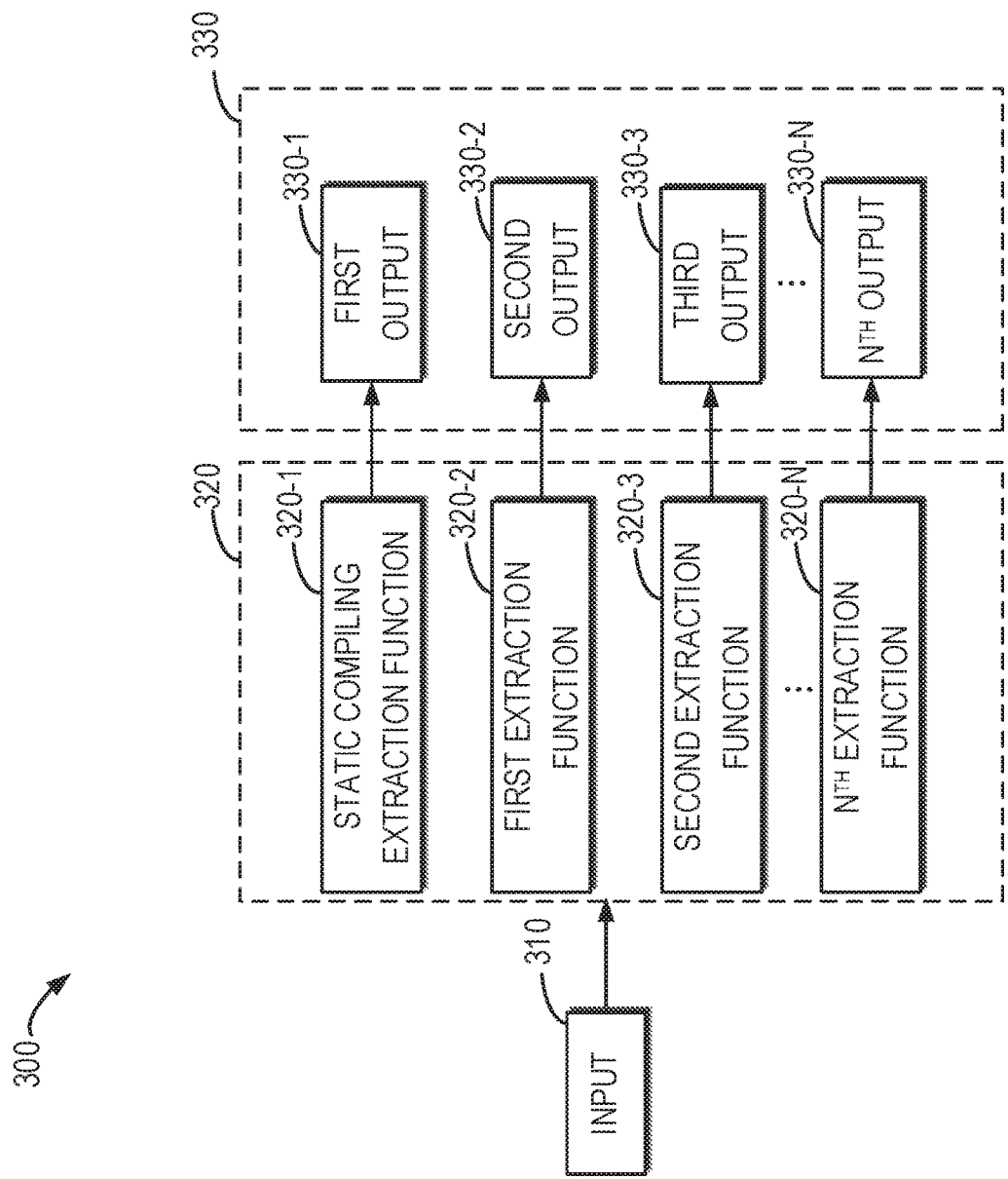
FIG. 3 illustrates an example framework of a metadata extraction system according to some embodiments of the present disclosure.

FIG. 3 illustrates an example framework of a metadata extracting system 300. As a non-limiting embodiment, the metadata extracting system 300 combines the static extraction method with the dynamic extraction method, and thus a plurality of extraction functions are provided in an existing compiler to extract synchronous metadata. In FIG. 3, the metadata extraction system 300 includes an input 310, a compiler 320 and an output 330. An example of the input 310 is source code corresponding to the application 150. The compiler 320 includes a static compiling extraction function 320-1, a first extraction function 320-2, a second extraction function 320-3, . . . , and an $N^{th}$ extraction function 320-N (which are collectively referred to as the extraction function 320 hereinafter). Correspondingly, the output 330 includes a first output 330-1, a second output 330-2, a third output 330-3, . . . , and an $N^{th}$ output 330-N (which are collectively referred to as the output 330 hereinafter), wherein N represents a natural number greater than 1. In one example, a static compiling extraction function 320-1 analyzes the input 310 to obtain a first output 330-1, the first extraction function 320-2 extracts layer distribution information of the model to obtain a second output 330-2, the second extraction function 320-3 extracts GPU kernel information to obtain a third output 330-3, and the $N^{th}$ extraction function 320-N estimates GPU resource information to obtain the $N^{th}$ output 330-N. It should be appreciated that more extraction functions can be provided to extract additional metadata.

As a non-limiting embodiment, the model of the deep learning application is a deep neural network (DNN). The metadata may include at least one of the number of the layers in the model, a type of one of the layers, and format information of data input to the deep learning application. Specifically, the type of one of the layers in the model may include a convolutional layer, a pooling layer, full connection or the like. As a non-limiting embodiment, the format of data input to the deep learning application can be a picture format, and corresponding format information may include a resolution of the picture, or the like. As a non-limiting embodiment, the dedicated processing resource required by the application 150 is a GPU. Correspondingly, the metadata includes at least one of the number of kernels required by the application 150, an amount of a computing resource of the GPU required by the application 150, and an amount of a memory resource of the GPU required by the application, among which the amount of the computing resource may include the number of threads, the number of kernels, the number of blocks, or the like. Metadata items will be further described hereinafter with reference to Table 1. Returning to FIG. 2, at step 230, the dedicated processing resource allocated to the application 150 is obtained, based on the metadata, by the client 120. The metadata may be analyzed by the client 120, or by the remote controller 140. A method 400 of analyzing the metadata by the client 120 and a method 500 of analyzing data by the remote controller 140 are introduced hereinafter with reference to FIGS. 4 and 5, respectively.

Figure 4:
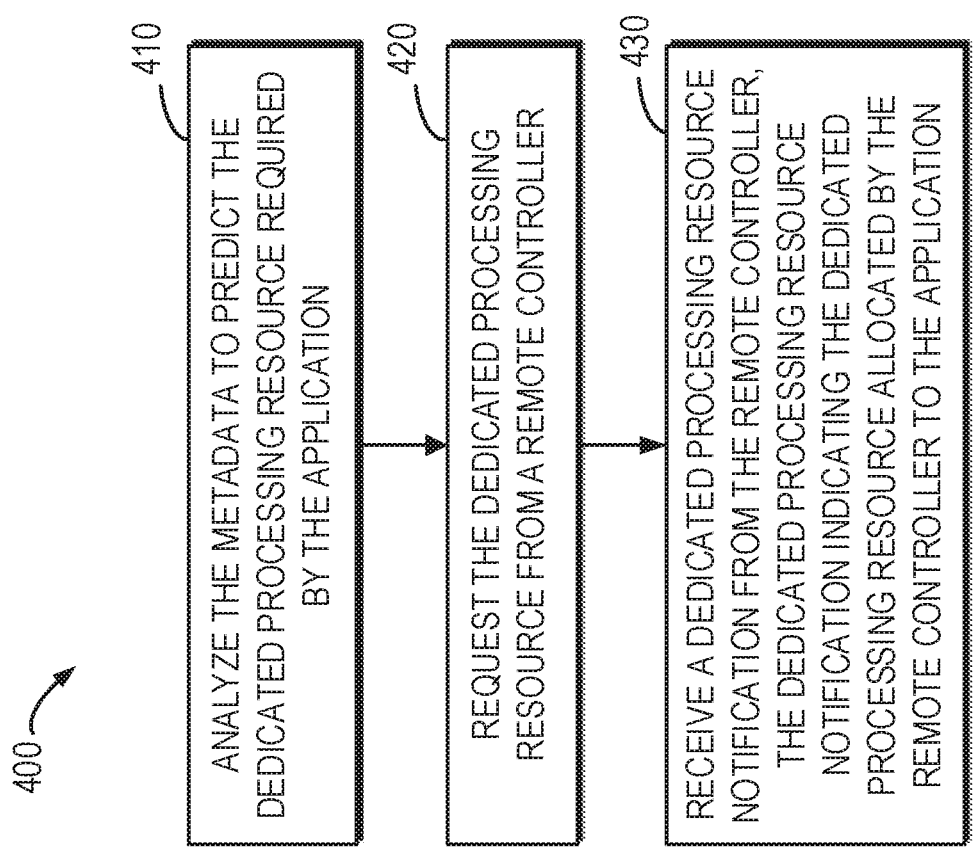
FIG. 4 illustrates a flowchart of a method in which metadata are analyzed by a client according to some embodiments of the present disclosure.

FIG. 4 illustrates a flowchart of the method 400 of analyzing the metadata by the client 120. At step 410, the metadata are analyzed by the client 120 to predict the dedicated processing resource 160 required by the application 150. At step 420, the client 120 requests the dedicated processing resource 160 from the remote controller 140. At step 430, the client 120 receives a notification of the dedicated processing resource from the remote controller 140, wherein the notification indicates that the dedicated processing resource is allocated to the application 150 by using the remote controller 140. In the method 400, the client 120 analyzes the metadata independently, so as to reduce the interaction with the remote controller 140 or the remote database 170, thereby decreasing the number of data interactions and lowering the load on the network 130.

Figure 5:
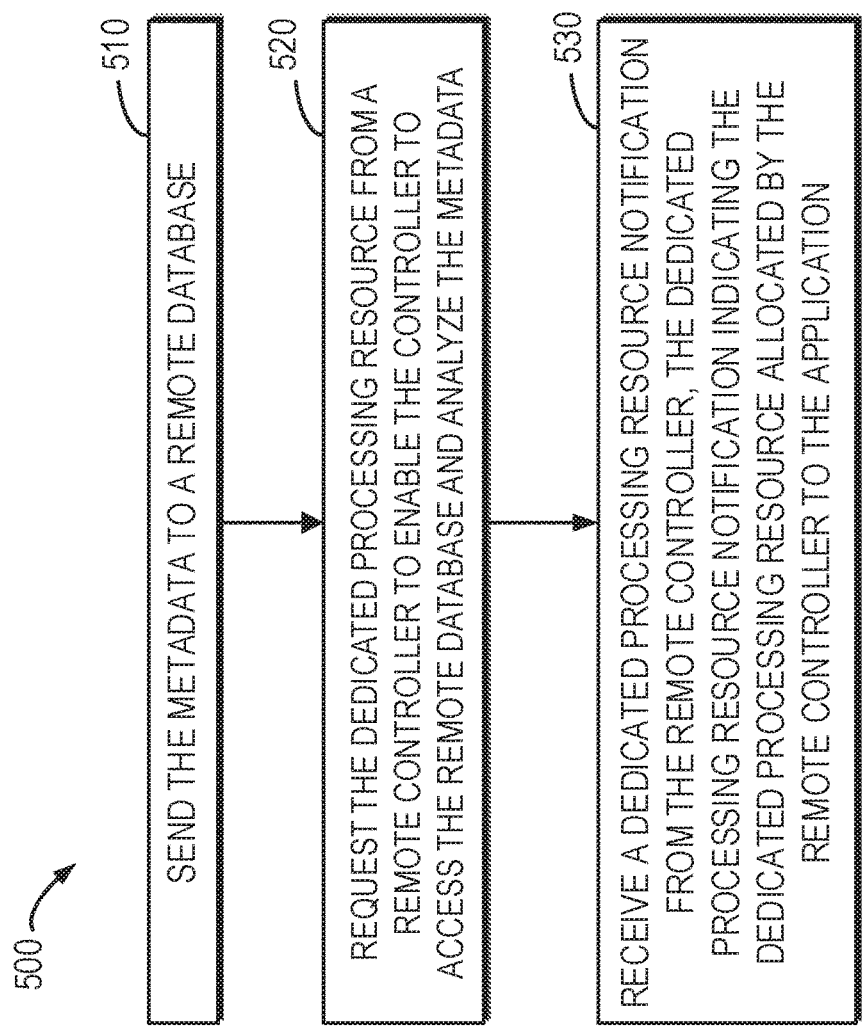
FIG. 5 illustrates a flowchart of a method in which metadata are analyzed by a remote server according to some embodiments of the present disclosure.

FIG. 5 illustrates a flowchart of a method 500 of analyzing data by the remote controller 140. At step 510, the metadata are transmitted by the client 120 to the remote database 170. At step 520, the client 120 requests the dedicated processing resource 160 from the remote controller 140, allowing the remote controller 140 to access the remote database 170 and analyze the metadata. At step 530, the client 120 receives a notification of the dedicated processing resource from the remote controller 140, and the notification indicates that the dedicated processing resource 160 is allocated to the application 150 by using the remote controller 140. In such an embodiment, the metadata are stored in the remote database 170, and the remote database 170 can be accessed by the remote controller 140.

As a non-limiting embodiment, the extracted metadata can be pre-processed prior to being stored in the remote database 170. Specifically, each application 150 may be assigned a universally unique identifier (UUID). Then, each metadata item in the metadata can be used as a parameter of the UUID of the application 150. Table 1 includes a storage format for the metadata in the remote database 170.

TABLE 1

| | Environment information | Model layer# | Layer list | Kernel # | Kernel list | Estimated memory | Estimated GPU blocks |
|---|---|---|---|---|---|---|---|
| UUID1 | Timestamp, IP, Exec cmd | 12 | {A, B,} | 100 | {F1, F2, . . . } | 500 MB | 4 |
| UUID2 | Timestamp, IP, Exec cmd | 50 | {A, B,} | 1000 | {F1, F2, . . . } | 5000 MB | 40 |
| . . . | . . . | . . . | . . . | . . . | . . . | . . . | . . . |

All the parameters listed in Table 1 may be sent to the remote database 170. The remote controller 140 can access information stored in the remote database 170 and schedule the dedicated processing resource 160. After the application 150 is assigned the dedicated processing resource 160 and is actually executed, the performance information of the application 150 and/or GPU performance information can be collected and fed back to the remote database 170. Accordingly, an entry of performance information fed back can be added into the Table 1.

By storing the metadata uniformly in the remote database 170, the metadata associated with different applications 150 can be stored uniformly for overall scheduling by the remote controller 140, thereby increasing the scheduling efficiency for the dedicated processing resource 160 and further improving the overall performance of the system 100.

As a non-limiting embodiment, the process in which the client 120 interacts with the remote controller 140 to obtain the dedicated processing resource 160 will be described hereinafter in detail. The client 120 may include a request module or interface for requesting a resource from the remote controller 140. The request module sends a dedicated processing request to the remote controller 140 via the interconnection network 130, and the request carries the UUID of the application 150. As a non-limiting embodiment, the dedicated processing resource request of the client 120 may also carry budget information and expected execution time of the application 150. The remote controller 140 queries the remote database 170 based on the information in the dedicated processing resource request, such as the UUID. The remote controller 140 can obtain the metadata information from the remote database 170 for advanced scheduling of the dedicated processing resources. Specific acts of the scheduling include performing comprehensive resource evaluation, and filtering and matching proper dedicated processing resources for the application 150 requesting the resources. During the scheduling process, the remote controller 140 can also refer to the actual historical running performance, so as to be applied to the normalized or weighted scheduling process. The remote controller 140 then returns the list or the number of the assigned dedicated processing resource 160 to the application 150.

Figure 6:
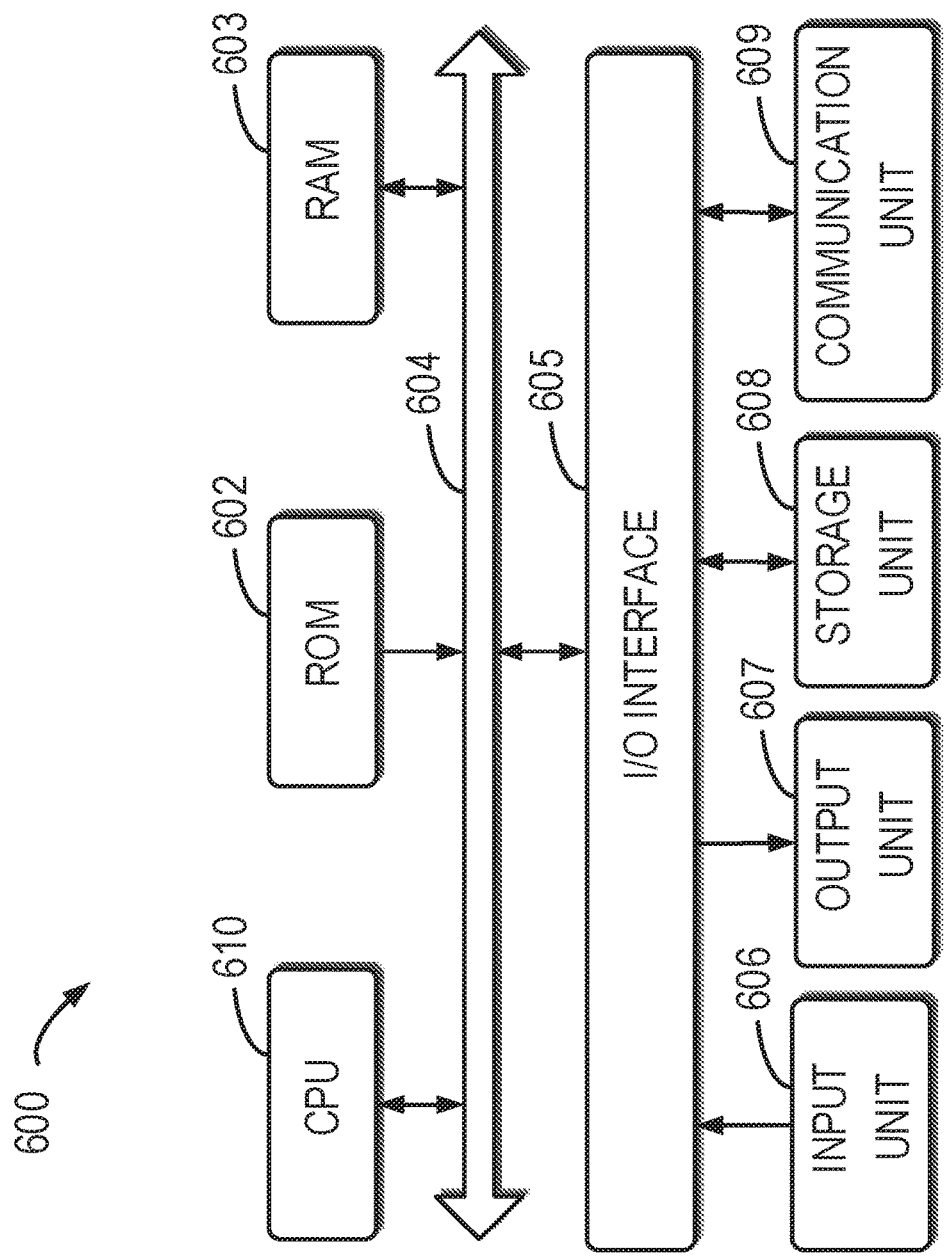
FIG. 6 illustrates a schematic block diagram of a device that may be used to implement embodiments of the present disclosure.

FIG. 6 illustrates a schematic diagram of a device 600 for implementing embodiments of the present disclosure. As illustrated, the device 600 includes a Central Processing Unit (CPU) 610 which executes various suitable acts and processing, based on a computer program instruction stored in a Read-Only Memory (ROM) 602 or a computer program instruction loaded from a storage unit 608 to a Random-Access Memory (RAM) 603. The RAM 603 stores a variety of programs and data required for operations of the device 600. CPU 610, ROM 602 and RAM 603 are connected via a bus 604 with one another. An input/output (I/O) interface 605 is also connected to the bus 604.

The following components in the device 600 are connected to the I/O interface 605: an input unit 606 such as a keyboard, a mouse or the like; an output unit 607 including various kinds of displays and a loudspeaker, etc.; a storage unit 608 including a magnetic disk, an optical disk, etc.; and a communication unit 609 including a network card, a modem, and a wireless communication transceiver, etc. The communication unit 609 allows the device 600 to exchange information/data with other devices through a computer network such as the Internet and/or various telecommunications networks.

Various processes and methods described above, e.g., the method 200 or 300, may be executed by the processing unit 601. For example, in some embodiments, the method 200 or 300 may be implemented as a computer software program tangibly included in a machine readable medium, e.g., the storage unit 608. In some embodiments, the computer programs may be partially or fully loaded and/or mounted onto the device 600 via ROM 602 and/or communication unit 609. When the computer program is loaded to the RAM 603 and executed by the CPU 610, one or more steps of the method 200 described above may be executed. Alternatively, in other embodiments, the CPU 610 can be configured in other appropriate manners to implement the above process/method.

Embodiments are applicable to various application scenarios. For example, by means of an embodiment of the present disclosure, the GPU resources matching the application could be filtered out or found based on the extracted metadata. Specifically, the extracted metadata can include the number of the layer of the deep learning model and historical layer performance status information, an estimated usage condition of GPU memory, estimated GPU computation blocks or the like. The process of searching the matched GPU resource involves obtaining the output information by processing the input information. The input information can include application metadata, optional cost information, optional performance expectation, and optional historical running performance; the input information may also include available GPUs and a GPU sharing status. Moreover, the output information includes a proper GPU to best achieve the goals. The goals to be achieved include at least one of the highest GPU utilization, the least resource competition on the existing running application, and the fastest running performance.

In addition, embodiments of the present disclosure are applicable to scheduling of quality of service (QoS). For example, for applications having similar resource needs, if possible, they shall not be placed on the same GPU. If an application requires a larger number of kernels while another application requires more memories, the two applications can share the same GPU. In other words, a computing-intensive application and a memory-intensive application can share the same GPU resource.

An embodiment of the present disclosure extracts metadata associated with the application during compiling of the application, stores the metadata in a center database, and subsequently performing advanced GPU resource management by using the stored metadata. It may also be possible to analyze the metadata by the client and obtain the GPU resource amount required by itself. A controller located distally from the client can allocate the GPU resource in the GPU resource pool to satisfy the need of the application. The scheduling can include initial GPU scheduling, and can also include dynamic resource re-scheduling for the QoS.

With embodiments of the present disclosure, multiple advantageous technical effects can be achieved. For example, whenever new source code has been built, the metadata of interest can be extracted automatically even though the source code has not been run actually. The automatic extraction process requires less experience, and is more efficiently than manual tuning. Moreover, embodiments of the present disclosure enable advanced GPU resource scheduling, which may match the needs of the application optimally and increase the resource utilization and reduce the resource competition. In accordance with embodiments of the present disclosure, the GPU resource can be allocated efficiently for various novel applications including the deep learning application.

The present disclosure may be a method, a device, a system, and/or a computer program product. The computer program product may include a computer readable storage medium having computer readable program instructions thereon for causing a processor to carry out aspects of the present disclosure.

The computer readable storage medium may be a tangible apparatus that retains and stores instructions used by an instruction execution apparatus. The computer readable storage medium may be, for example, but is not limited to, an electronic storage apparatus, a magnetic storage apparatus, an optical storage apparatus, an electromagnetic storage apparatus, a semiconductor storage apparatus, or any suitable combination thereof. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as including transitory signals per se, such as radio waves or other freely propagating electromagnetic waves, electromagnetic waves propagating through a waveguide or other transmission media (e.g., light pulses passing through a fiber-optic cable), or electrical signals propagated through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and the traditional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In a scenario involving the remote computer, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart and/or block diagrams of methods, devices (systems), and computer program products according to embodiments of the disclosure. It will be understood that each block of the flowchart and/or block diagrams, and combinations of blocks in the flowchart and/or block diagrams, may be implemented by computer readable program instructions.

These computer readable program instructions may be provided to a processing unit of a general purpose computer, special purpose computer, or other programmable data processing device to produce a machine, such that the instructions, when executed via the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing device, and/or other apparatus to function in a particular manner, such that the computer readable storage medium having instructions stored therein includes an article of manufacture including instructions which implement aspects of the function/act specified in the block or blocks of the flowchart and/or the block diagram.

The computer readable program instructions may also be loaded onto a computer, other programmable data processing devices, or other apparatus to cause a series of operational steps to be performed on the computer, other programmable devices or other apparatus to produce a computer implemented process, such that the instructions which are executed on the computer, other programmable devices, or other apparatus implement the functions/acts specified in the flowchart and/or block diagram block or blocks.

The flowchart and block diagrams in the accompanying drawings illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions indicated in the block may also occur in a different order than that indicated in the drawings. For example, two blocks in succession may, in fact, be executed substantially in parallel, or the blocks may sometimes be executed in a reversed order, depending upon the functionality involved. It will also be noted that each block of the block diagrams and/or the flowchart, and combinations of blocks in the block diagrams and/or the flowchart, can be implemented by special purpose hardware-based systems that perform the specified functions or acts, or combinations of special purpose hardware and computer instructions.

The descriptions of the various embodiments of the present disclosure have been presented for illustrative purpose, but are not intended to be exhaustive or limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of scheduling a dedicated processing resource, comprising:
   obtaining source code of an application to be compiled;
   extracting, during compiling of the source code, metadata through an extraction function embedded in a compiler for compiling the source code, the metadata being associated with the application, and the metadata indicating an amount of the dedicated processing resource required by the application; and
   obtaining, based on the metadata, the dedicated processing resource allocated to the application.

2. The method of claim 1, wherein obtaining the dedicated processing resource allocated to the application comprises:
   analyzing the metadata to predict the dedicated processing resource required by the application;

requesting the dedicated processing resource from a remote controller; and receiving a dedicated processing resource notification from the remote controller, the dedicated processing resource notification indicating the dedicated processing resource allocated by the remote controller to the application.

3. The method of claim 1, wherein obtaining the dedicated processing resource allocated to the application comprises:

sending the metadata to a remote database;

requesting the dedicated processing resource from a remote controller to enable the controller to access the remote database and analyze the metadata; and receiving a dedicated processing resource notification from the remote controller, the dedicated processing resource notification indicating the dedicated processing resource allocated by the remote controller to the application.

4. The method of claim 1, wherein the application comprises a deep learning application, and wherein the metadata comprises at least one of:

a type of at least one layer in a model of the deep learning application;

the number of layers in the model of the deep learning application; and a format of data input to the deep learning application.

5. The method of claim 1, wherein the dedicated processing resource required by the application is a graphical processing unit (GPU), and wherein the metadata comprises at least one of:

a number of kernels of the GPU required by the application;

an amount of a computing resource of the GPU required by the application; and an amount of a memory resource of the GPU required by the application.

6. The method of claim 5, wherein the application obtains the required GPU from a GPU resource pool via a network connection.

7. The method of claim 1, wherein extracting the metadata associated with the application comprises:

obtaining a journal generated during compiling of the source code; and extracting, based on the journal, the metadata associated with the application.

8. A device for scheduling a dedicated processing resource, comprising:

at least one processing unit; and at least one memory coupled to the at least one processing unit and storing instructions executed by the at least one processing unit, the instructions, when executed by the at least one processing unit, causing the device to execute acts, the acts comprising:

obtaining source code of an application to be compiled;

extracting, during compiling of the source code, metadata through an extraction function embedded in a compiler for compiling the source code, the metadata being associated with the application, and the metadata indicating an amount of the dedicated processing resource required by the application; and obtaining, based on the metadata, the dedicated processing resource allocated to the application.

9. The device of claim 8, wherein obtaining the dedicated processing resource allocated to the application comprises:

analyzing the metadata to predict the dedicated processing resource required by the application;

requesting the dedicated processing resource from a remote controller; and receiving a dedicated processing resource notification from the remote controller, the dedicated processing resource notification indicating the dedicated processing resource allocated by the remote controller to the application.

10. The device of claim 8, wherein obtaining the dedicated processing resource allocated to the application comprises:

sending the metadata to a remote database;

requesting the dedicated processing resource from a remote controller to enable the controller to access the remote database and analyze the metadata; and receiving a dedicated processing resource notification from the remote controller, the dedicated processing resource notification indicating the dedicated processing resource allocated by the remote controller to the application.

11. The device of claim 8, wherein the application comprises a deep learning application, and wherein the metadata comprise at least one of:

a type of one of layers in a model of the deep learning application;

the number of the layers in the model of the deep learning application; and a format of data input to the deep learning application.

12. The device of claim 8, wherein the dedicated processing resource required by the application is a graphical processing unit (GPU), and wherein the metadata comprises at least one of:

a number of kernels of the GPU required by the application;

an amount of a computing resource of the GPU required by the application; and an amount of a memory resource of the GPU required by the application.

13. The device of claim 12, wherein the application obtains the required GPU from a GPU resource pool via a network connection.

14. The device of claim 8, wherein extracting the metadata associated with the application comprises:

obtaining a journal generated during compiling of the source code; and extracting, based on the journal, the metadata associated with the application.

15. A computer readable program product, which stores machine executable instructions thereon, the machine executable instructions, when executed by at least one processor, causing the at least one processor to implement a method of scheduling a dedicated processing resource, comprising:

obtaining source code of an application to be compiled;

extracting, during compiling of the source code, metadata through an extraction function embedded in a compiler for compiling the source code, the metadata being associated with the application, and the metadata indicating an amount of the dedicated processing resource required by the application; and obtaining, based on the metadata, the dedicated processing resource allocated to the application.

16. The computer readable program product of claim 15, wherein obtaining the dedicated processing resource allocated to the application comprises:

analyzing the metadata to predict the dedicated processing resource required by the application;

requesting the dedicated processing resource from a remote controller; and receiving a dedicated processing resource notification from the remote controller, the dedicated processing resource notification indicating the dedicated processing resource allocated by the remote controller to the application.

17. The computer readable program product of claim 15, wherein obtaining the dedicated processing resource allocated to the application comprises:

sending the metadata to a remote database;

requesting the dedicated processing resource from a remote controller to enable the controller to access the remote database and analyze the metadata; and receiving a dedicated processing resource notification from the remote controller, the dedicated processing resource notification indicating the dedicated processing resource allocated by the remote controller to the application.

18. The computer readable program product of claim 15, wherein the application comprises a deep learning application, and wherein the metadata comprises at least one of:

a type of at least one layer in a model of the deep learning application;

the number of layers in the model of the deep learning application; and a format of data input to the deep learning application.

19. The computer readable program product of claim 15, wherein the dedicated processing resource required by the application is a graphical processing unit (GPU), and wherein the metadata comprises at least one of:

a number of kernels of the GPU required by the application;

an amount of a computing resource of the GPU required by the application; and an amount of a memory resource of the GPU required by the application.

20. The computer readable program product of claim 19, wherein the application obtains the required GPU from a GPU resource pool via a network connection.

* * * * *